United States Patent [19]
King

[11] Patent Number: 5,245,255
[45] Date of Patent: Sep. 14, 1993

[54] ENERGY SAVING SYSTEM FOR FLIGHT SIMULATORS

[76] Inventor: Bruce A. King, 6125 S. New Hope Rd., Belmont, N.C. 28012

[21] Appl. No.: 888,165

[22] Filed: May 26, 1992

[51] Int. Cl.$^5$ ............................ H02P 3/00; G09B 9/10
[52] U.S. Cl. ........................................ 318/34; 434/37; 434/45
[58] Field of Search .................. 434/29, 30, 35, 37, 434/45; 364/578; 318/34

[56] References Cited

U.S. PATENT DOCUMENTS

| | | | |
|---|---|---|---|
| 4,340,274 | 7/1982 | Spooner | 350/128 |
| 5,009,598 | 4/1991 | Bennington | 434/30 |
| 5,071,352 | 12/1991 | Denne | 434/29 |

Primary Examiner—Bentsu Ro
Attorney, Agent, or Firm—Judith E. Garmon

[57] ABSTRACT

A control system and process method for reducing energy consumption of flight simulators includes electronic circuitry to automatically control the starting and stopping of the large motors that drive the hydraulic pumps for the motion system. The electronic circuitry monitors existing signals in the simulator motion and control loading cabinet and determines when the motors need to be started or stopped automatically. The circuitry generates the necessary outputs to start and stop the motors at the user level, and interfaces to the manual (user) motor control switches. The Energy Saving Control System (E.S.C.S.) provides a safe and reliable means of producing substantial electrical energy savings.

22 Claims, 10 Drawing Sheets

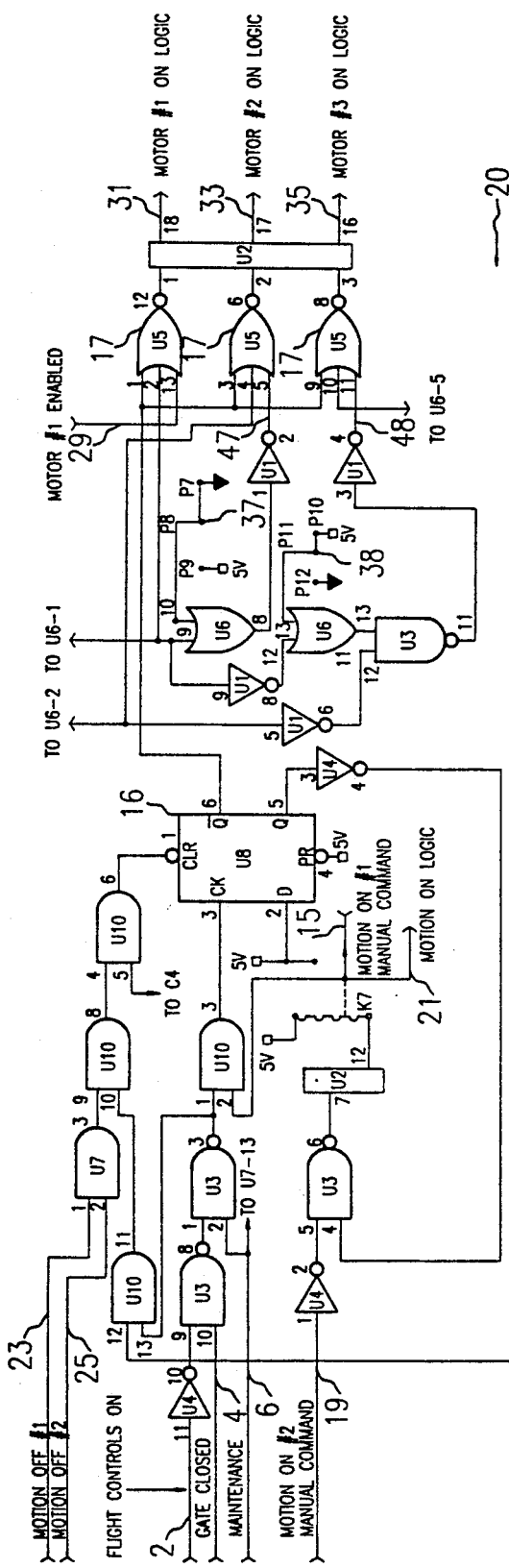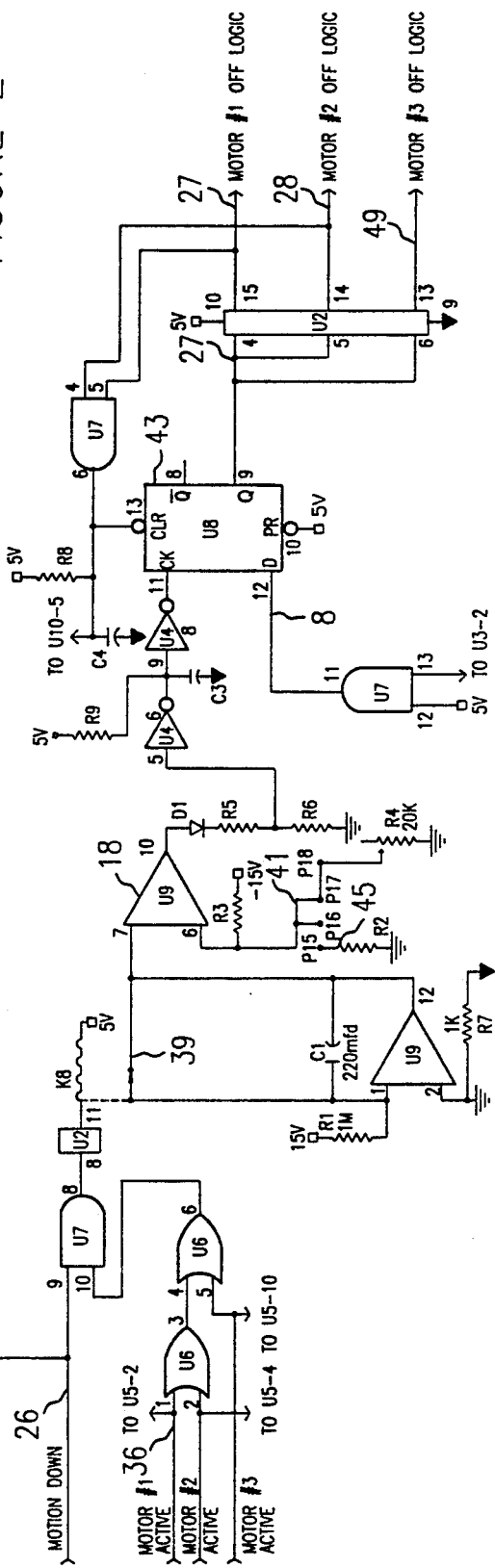
FIGURE 2

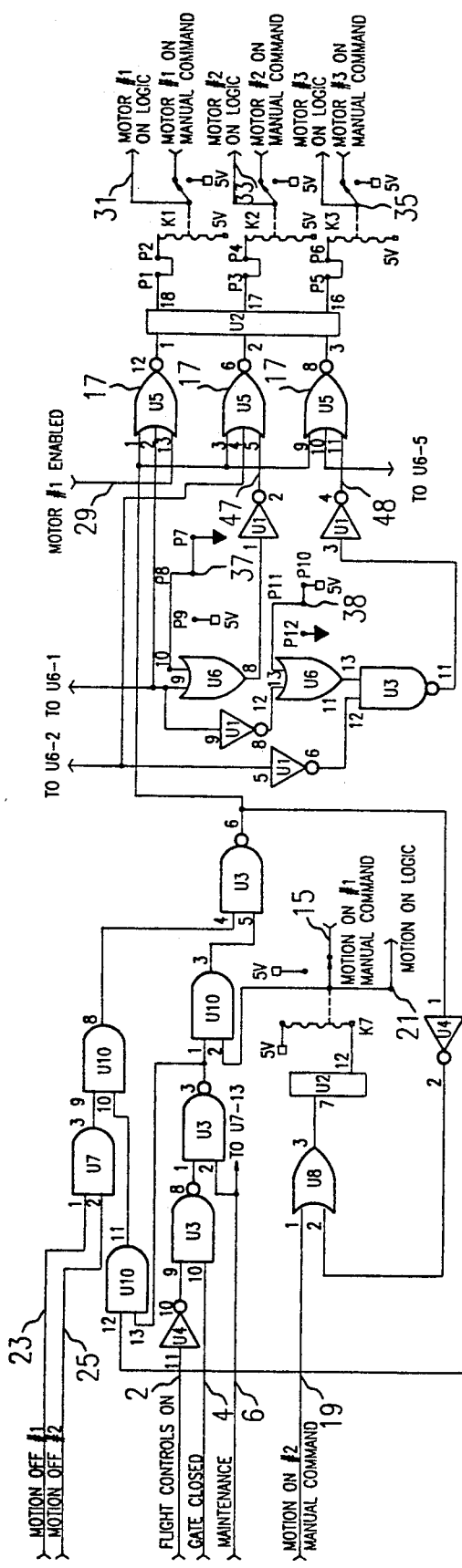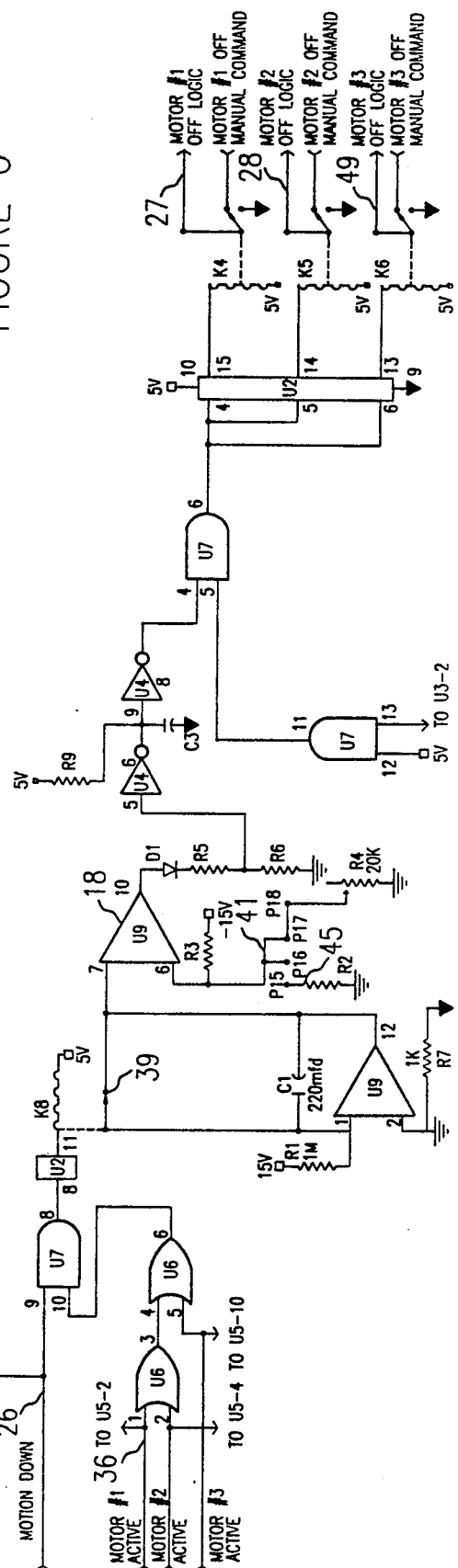
FIGURE 6

Flow Chart of New Method

Flow Chart of Prior Art

ENERGY SAVING SYSTEM FOR FLIGHT SIMULATORS

BACKGROUND AND SUMMARY OF PRESENT INVENTION

This invention relates to Flight Simulators, specifically to a new process method in the operation of the motion system to reduce energy expenses.

Where the term simulator is used it is referring to the types of Flight simulators used by military and commercial operators, that generally have a six-axis motion system. The six-axis simulators are commonly referred to as full flight simulators, six degrees of freedom simulators, phase 2 or 3 simulators, and now rated by the FAA as level C or D simulators.

Currently the normal operation of a six-axis simulator motion system is the manual selection of motor start switches by the simulator maintenance personnel. Typically there are five motor driven pumps on a six-axis simulator. The first motor typically is the smallest (10-20 hp.) and drives a cooling pump as well as a control loading pump. The cooling pump and the control loading system are generally left on at all times. Control loading is defined as the system that provides the realistic feel to the flight controls in the simulator. The other three motors are typically 50 hp. and each drives a large hydraulic pump. These hydraulic pumps supply flow and pressure to a common pressure line for the motion system. The motion system of a six-axis simulator consists of six actuators that are each controlled by complex servo systems. The motion system operates in one of four states, at rest (no pressure), at neutral (midpoint of travel), moving (simulating airplane characteristics), or in the on/off sequence (between at rest and neutral).

The flight instructor has access to the motion-on/off only and not the manual motor controls. Therefore he would have to call the simulator maintenance personnel if the motors/pumps were off at the beginning of the day (ref. FIG. 8). Typically the motors/pumps are left running when the simulator is intended to be used during that day and frequently left running at all times 24 hours a day. The typical cost to run the three motors is $3.80 per hour based on 5.5 cents per kilowatt hour. An average facility with ten simulators is spending about $300,000 per year just to power their motion motors.

The primary objective of the new process method of the present invention is to reduce energy costs. By adding the necessary electronics and logic circuitry, the on/off control of the motors will be automatic, therefore greatly increasing the off time of the motors and pumps.

Because it takes only seconds to start the motion motors, the automatic control will be activated by the flight instructor when selecting the motion-on or off switches. The flight instructor will also find it unnecessary to turn on the motion at the very beginning of the training session when the type of training only involves briefing, preflight checkout, or cockpit familiarization. This part of the process, method (informing the instructors of the new system) will add even more to the energy savings. The conditions that occur everyday that add to the automatic energy savings are, training sessions that are canceled, training sessions that do not require motion, breaks during sessions, early completion of sessions and unscheduled times during the day and at night when the motors and pumps are still running.

When the number of hours per year that fall into each category above are totalled, and that total is multiplied by the number of six-axis simulators in the U.S. or in the world, the result is significant, typically 2800 hrs. per year times 350 simulators in the U.S. equals 980,000 hours. An average estimate of $3.80 per hour to run the three motors times 980,000 hours equals 3.72 million dollars saved in the U.S. In the foreign countries with 500 simulators, the estimate equals 5.32 million dollars. This equals 9.04 million dollars saved worldwide.

Other advantages include the simplicity of the present invention which results in low installation costs, low maintenance costs and ease of operation (automatic).

The new process method of automatically controlling the on/off selections of the motion motors is explained (ref. FIG. 9). The basic overview of the new process method of the present invention can be viewed as an electronic decision maker receiving information by the sensing of prescribed conditions existing in the simulator motion and control loading cabinet, and creating the necessary outputs to accomplish the task of the new process method. This task is to start the motors when needed and then shut the motors off when the motion is not in use (ref. FIG. 11). Several circuit variations have been included to provide versatility. These circuits are all referred to as E.S.C.U.'s, (Energy Saving Control Unit).

At the start of a day the motion and control loading electronics will be in this state: cooling and control loading motor running, control loading system activated and each motion motor will show ready. The flight instructor, upon entering the simulator and closing the necessary doors, will not turn on the motion system until he actually needs it. Since the motion is not actually needed during the preflight, briefings and procedure explanations, the instructor can typically wait one-half hour before he actually turns on the motion system.

When the motion-on momentary pushbutton is selected, the motors will begin to automatically start one at a time in sequence. Then the drawbridge will raise up and the motion will pressurize, bringing the simulator up to the midpoint of travel. The training session will then commence for a period of time dependent on the type of training and number of pilots in the simulator.

When the instructor decides to finish or to take a break he will select the motion-off switch. The simulator will lower to the down position, depressurize and the drawbridge will lower. After a time period preset in the present invention, the motors will shut off automatically and return to their ready state.

Due to the many different types of simulators and design differences, there are many different approaches to implementing this new apparatus and process method. One way is to change the PROM logic in the motion and control loading electronic cabinet. This would not be a desirable way to accomplish the task due to the added complexity that would be inserted into the system. This would result in causing excessive downtime of the equipment due to increased troubleshooting time required to find and repair common faults.

The preferred approach is to add a circuit board containing the E.S.C.U. which circuit board and circuitry interfaces to the simulator motion and control loading cabinet. This makes it easier to install, remove and bypass when necessary to troubleshoot the system.

This method also ensures that all safety interlocks, features and fault warning capabilities of the simulator are not downgraded. This E.S.C.U. board can be mounted in the motion cabinet with a wire wrap edge connector. The necessary signals are typically available on a wire wrap backplane.

The new process method will first of all reduce energy expenses. The average customer interested in the present invention pays over $500,000 per year in total electricity bills for their training facility. With the new system implemented it would decrease their total energy expenses by 15 to 20 percent.

Through use of the present system, the decrease in energy consumption will obviously benefit the simulator operator by means of cash savings, and subsequently benefit the world by means of preserving natural resources used in developing energy. Also the byproducts of developing energy such as pollution will be decreased.

Since this new process method can be implemented incrementally at each facility, the benefits can begin as the first E.S.C.U. is installed on the first simulator. The progress will continue at a steady rate as each simulator is equipped with the energy saving system. As new simulators are built they can be designed with the present invention in mind thus making it a standard feature on all flight simulators.

DESCRIPTION OF THE DRAWINGS

FIG. 2 is a schematic of E.S.C.U. No. 2 which is an alternate embodiment having a timer and direct interfacing for controlling three motor logic circuits.

FIG. 6 is a schematic of E.S.C.U. No. 6 which is an alternate embodiment having a timer and relay interfacing for controlling three motor logic circuits.

DETAILED OPERATION OF THE PREFERRED EMBODIMENT

Figure 1:
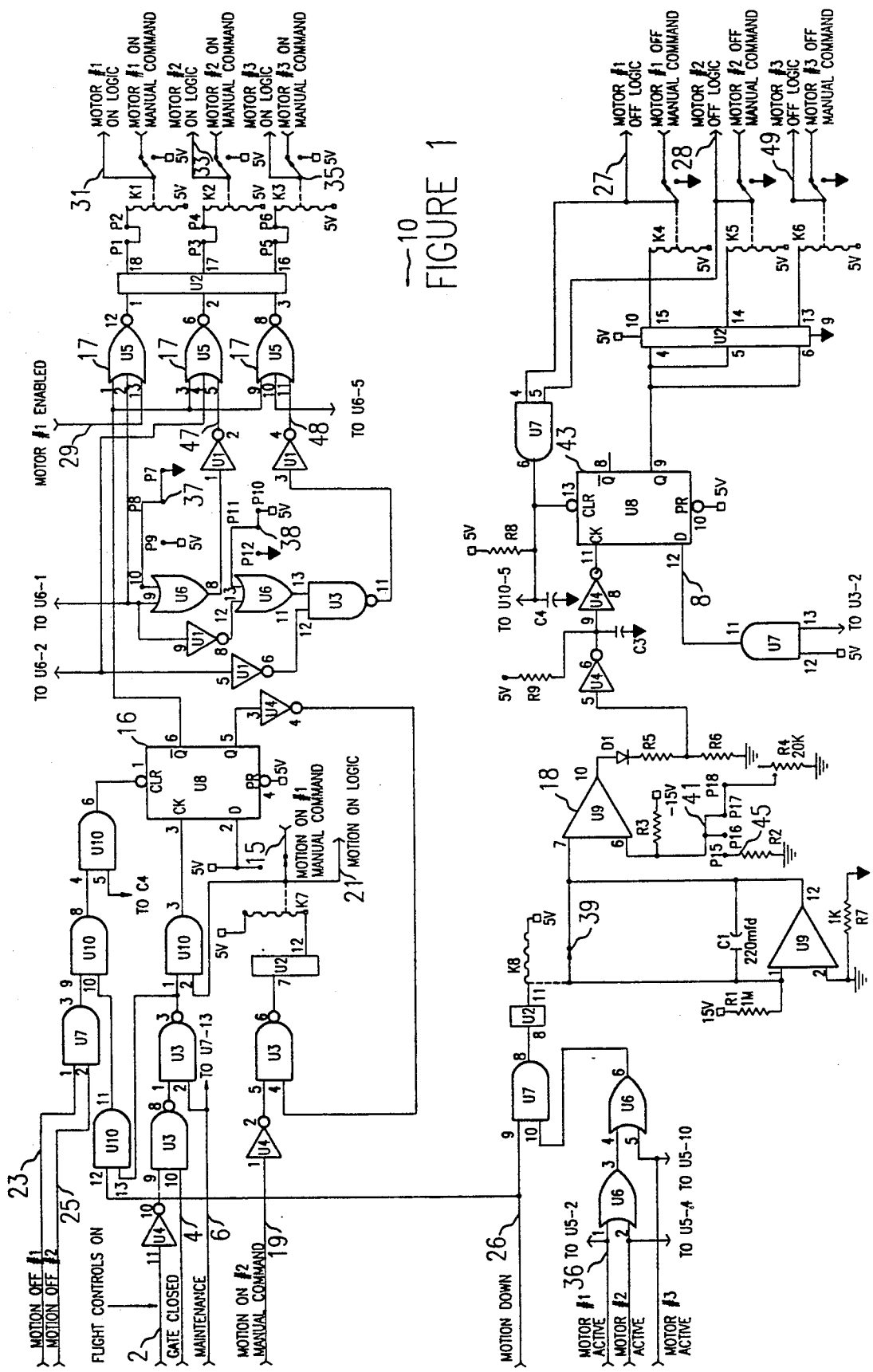
FIG. 1 is a schematic of E.S.C.U. No. 1 which is the preferred embodiment having a timer and relay interfacing for controlling three motor logic circuits.

Referring to FIG. 1, with the simulator hydraulic control cabinet power on, the E.S.C.U. board 10 is also powered but not activating any signals. The power requirements are +5 volts and ±15 volts for this E.S.C.U. All of the eight relays are in the deenergized state. When the control loading and cooling motor is turned on and the flight controls are on, the simulator is ready for flight training. The E.S.C.U. 10 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 10 will automatically shut off the motors when the motion is not in use. A means of overriding the automatic motor-off command is available by placing the simulator in the maintenance mode 6 to allow the motors to continue running. This is for troubleshooting purposes or performing fluid filtering procedures. This maintenance mode 6 allows the motor start 16 sequence to activate regardless of the state of the flight controls 2 or the ingress/egress gate position 4 by causing U3-3 (74LS00 NAND) to be high when the maintenance mode 6 is placing a low on U3-2. The motor-off pulse is prevented by the low logic level present on U8-12 via U7-13 8 (74LS08 AND).

With the flight controls on 2, a low logic level is present on U4-11 (74LS04 INVERTOR) and the gate closed 4 (high on U3-10) the output of U3-8 is low. With the maintenance mode 6 off, (U3-2 normally high) the output of U3-3 and U10-1 is high. When the motion-on momentary pushbutton 15 is selected, it places a high logic level on U10-2 and activates a latching circuit that keeps the motion-on logic 21 active. As U10-3 goes high it clocks the start flip flop 16 U8 (74LS74) and latches a high on the Q output (pin 5) and a low on the not-Q output (pin 6), this low is sent to each of the 74LS27 NOR gates 17 (U5-1,3,9) The Q output is inverted at U4-3 and U4-4 and sent to U3-4 so that the output of U3-6 will be high when the motion is turned on from either the manual control cabinet 19 or the momentary pushbutton 15 at the instructor's station. The output U3-6 enables U2-7 (ULN2803A) to pull in relay K7(DF2E-DC-5V) to keep the motion-on logic 21 latched active while the motors are starting. The latched flip-flop 16 (U8) will be cleared by any motion-off request 23 or 25, motion rising from the down position 26, any motor-off request 27 or 28, flight controls off 2 or when the gate is opened 4. The output of U10-6 when low clears U8 motor start 16 logic. Motion-off requests 23,25 are on U7-1,2 and the down logic 26 is on U10-12, the flight control z and gate logic 4 comes from U3-3 and these outputs are summed up at U10-9,10 and the output of U10-8 goes to U10-4. The input to U10-5 is low when any motor-off request 27 or 28 is active via U7-6, to clear any motor start 16 sequence that may be active when the motor-off 27 or 28 commands are active.

With all of the previous conditions correct to make an actual motion-on 21 sequence start, the not-Q output of U8 will be low and sent to each separate start 17 sequence circuit U5-1,3,9. The first motor 29 to start will have a low on U5-2 (not active) and a low on U5-13 (enabled). This will output a high on U5-12 to enable the start relay K1 to send a high level out to the motor start logic 31. When this motor starts a high active signal 36 comes back into U6-9 (74LS32 OR) to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P11 38 comprises a bypass means and is normally jumpered to ground. When it is jumpered to 5 volts it puts motor number two in bypass mode.

Motors number two and number three will start 33,35 in the same manner as motor number one using U5-6,8 to provide the high level for U2-2,3 to pull in the relays K2 and K3. When the motors are active, the hydraulic control cabinet provides a motion-ready signal (associated with the simulator and not shown on circuit diagram) and along with the motion-on logic 21 that is still active, will result in the drawbridge and motion coming up. The motor start 16 logic then resets and the simulator is operating in its usual state, all safety and warning logic is operating and the flight training continues as usual. Note that during the motor start 16 sequence, the timer 18 for controlling the motor-off logic is running as explained on this page. The timer 18 will not actually finish before the motion 26 is up and resets it via U7-9.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. This causes U2-11 to supply a low level (current sink) to pull in K8. This starts the timer 18 for controlling the motor-off sequence. When K8 energizes it removes the short 39 across C1 (220 mfd) and allows C1 to start charging. This creates a ramp generator with the output of U9-12 (UA747CN OP AMP) slowly going more negative. This time period can be preset to any time specified by the user, typically it will be set for two minutes. The potentiometer R4 and R2 can be individually connected with jumpers 41 p15,16,17,18 to preset the voltage on U9-6. Normally it is set for P17 to P18. The P15 to P16 45 selection is for testing purposes to make the timing period equal to twenty seconds. When the voltage level on U9-7 is more negative than the preset voltage on U9-6 the output of U9-10 will swing from −15v to +15v. The level at U4-5 will be high then inverted at U4-6 (low). The level at U4-9 will also be low then inverted at U4-8 to provide a clean signal to clock the stop flip-flop 43 U8-11.

The level present on U8-12 will normally be high (not maint. mode) 6 and will be latched to the Q output U8-9. This high on each input of U2-4,5,6 will energize the relays K4,5,6 causing a low level to be momentarily switched onto the motor-off logic lines 27,28,49 that cause the motors to stop. As the low is active it also puts a low on U7-4,5 which clears U8-13. The capacitor C4 located at U8-13 is to slow down the low clear pulse to ensure all motors receive a sufficient stop pulse before it is cleared. This low stop pulse also clears U8-1 via U10-5 to ensure there is not a motor start 16 sequence active at this time. The simulator will now be ready for the next motion-on request 15 or 19.

Figure 10:
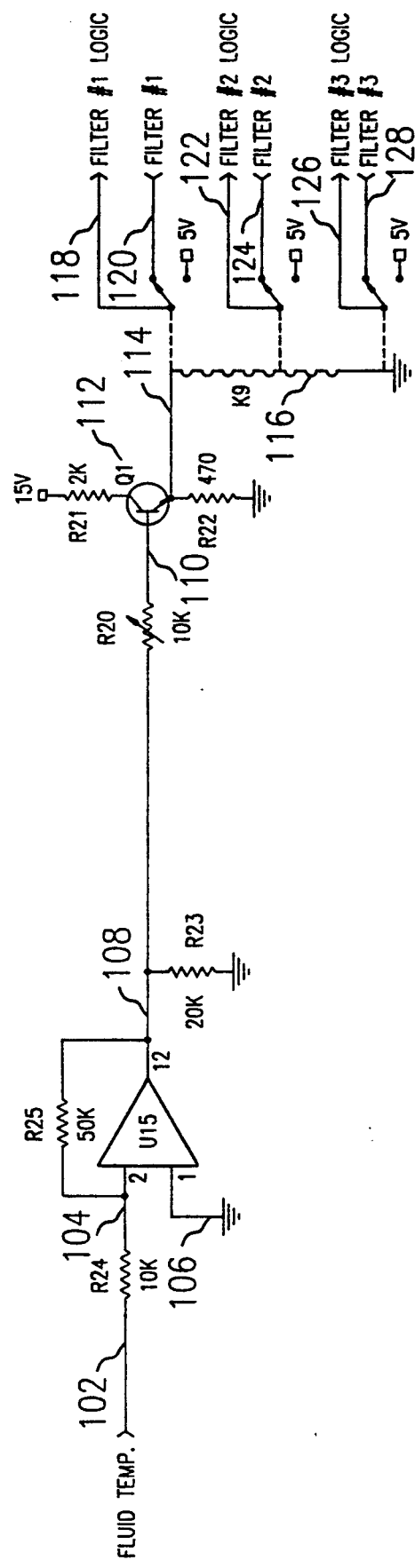
FIG. 10 is a schematic of filter bypass option which will be added to an E.S.C.U. when necessary.
Figure 11:
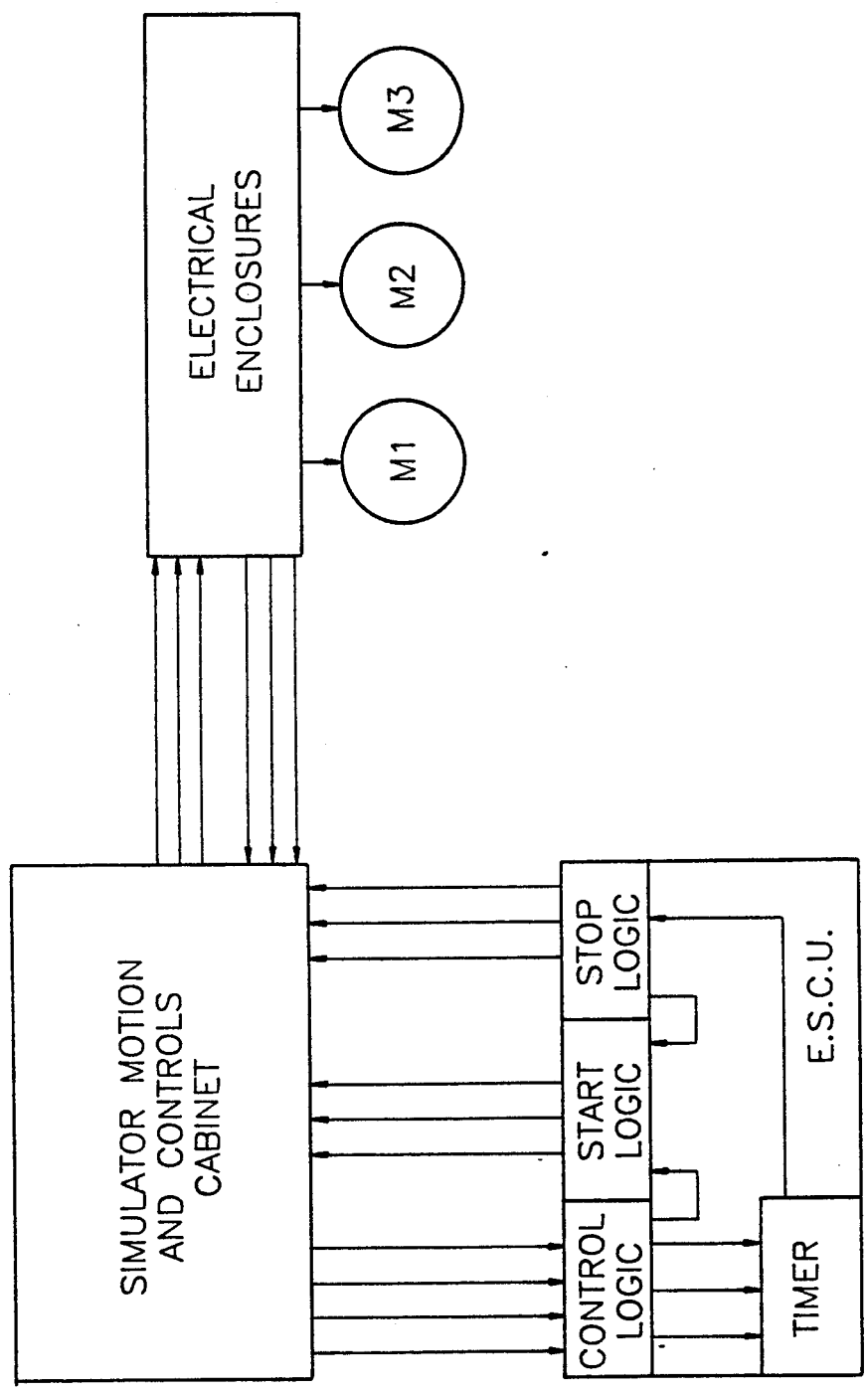
FIG. 11 is a block diagram of the preferred embodiment shown in FIG. 1.

The E.S.C.U. shown in FIG. 1 10 is the most preferred design. It is easily adapted to any type of simulator. The design includes three motor stop circuits to make it universal. Some simulators will only require one stop signal that will itself turn off all three motors. Because the added cost and labor to include the other two relay circuits is very minimal they were included. The advantage of this circuit being added to the existing equipment instead of modifying the equipment is the reduced complexity. If the simulator needs troubleshooting, an isolation means is provided whereby the E.S.C.U. can be easily bypassed by removing it and inserting a board with jumper wires. The relays for the motor start and stop commands are to make it adaptable to logic lines that are hard wired to ground for a low logic level and 5v for a high logic level. Some of the practicalities of the preferred embodiment are the adjustable timer for the motor stop delay, the universal interfacing capabilities due to the relays for the motor start and stop commands. Also the troublefree start flip-flop circuit that is not affected by any motion-on request pushbutton that may produce a switch bounce condition, adds to the required reliability.

DETAILED OPERATION OF ALTERNATE EMBODIMENT

Referring to FIG. 2, with the simulator hydraulic control cabinet power on, the E.S.C.U. board 20 is also powered but not activating any signals. The power requirements are +5 volts and +15 volts for this E.S.-C.U. The two relays are in the deenergized state. When the control loading and cooling motor is turned on and the flight controls are on, the simulator is ready for flight training. The E.S.C.U. 20 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 20 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 by causing U3-3 (74LS00 NAND) to be high when the maintenance mode 6 is placing a low on U3-2. The motor-off pulse is prevented by the low logic level present on U8-12 via U7-13 s (74LS08 AND).

With the flight controls on 2, a low logic level is present on U4-11 (74LS04 INVERTOR) and the gate closed 4 (high on U3-10) the output of U3-8 is low. With the maintenance mode 6 off, (U3-2normally high) the output of U3-3 and U10-1 is high. When the motion-on momentary pushbutton 15 is selected, it places a high logic level on U10-2 and activates a latching circuit that keeps the motion-on logic 21 active. As U10-3 goes high it clocks the start flip flop 16 U8 (74LS74) and latches a high on the Q output (pin 5) and a low on the not-Q output (pin 6), this low is sent to each of the (74LS27) NOR gates 17 (U5-1,3,9).

The Q output is inverted at U4-3 and U4-4 and sent to U3-4 so that the output of U3-6 will be high when the motion is turned on from either the manual control cabinet 19 or the momentary pushbutton 15 at the instructor's station. The output U3-6 enables U2-7 (ULN2803A) to pull in K7 (DF2E-DC-5V) to keep the motion-on logic 21 latched active while the motors are starting. The latched flip-flop 16 (U8) will be cleared by any motion-off request 23 or 25, motion rising from the down position 26, any motor-off request 27 or 28, flight controls off 2 or when the gate is opened 4. The output of U10-6 when low clears U8 motor start 16 logic. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U10-4. The input to U10-5 is low when any motor-off request 27 or 28 is active via U7-6, to clear any motor start 16 sequence that may be active when the motor-off 27 or 28 commands are active.

With all of the previous conditions correct to make an actual motion-on 21 sequence start, the not-Q output of U8 will be low and 20 sent to each separate motor start 17 sequence circuit U5-1,3,9. The first motor 29 to start will have a low on U5-2 (not active) and a low on U5-13 (enabled). This will output a high on U5-12 to enable U2-1 to send a start command out to the motor start logic 31 via U2-18. When this motor starts a high active signal 36 comes back into U6-9 (74LS32 OR) to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P11 38 comprises a bypass means and is normally jumpered to ground. When jumpered to 5 volts it puts motor number two in bypass mode.

Motors number two and number three will start 33,35 in the same manner as motor number one using U5-6,8 to provide the high level for U2-2,3 to provide the start commands at U2-17,16. When the motors are active, the hydraulic control cabinet provides a motion-ready signal (associated with the simulator and not shown on circuit diagram) and along with the motion-on logic 21 that is still active, will result in the motion rising. The motor start 16 logic then resets and the simulator is operating in its usual state, all safety and warning logic is operating and the flight training continues as usual. Note that during the motor start 16 sequence, the timer 18 for controlling the motor-off logic is running as explained on this page. The timer 18 will not actually finish before the motion 26 is up and resets it via U7-9.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. This causes U2-11 to supply a low level (current sink) to pull in K8. This starts the timer 18 for controlling the motor-off sequence. When K8 energizes it removes the short 39 across C1 (220mfd) and allows C1 to start charging. This creates a ramp generator with the output of U9-12 (UA747CN OP AMP) slowly going more negative. This time period can be preset to any time specified by the user, typically it will be set for two minutes. The potentiometer R4 and R2 can be individually connected with jumpers 41 P15,16,17,18 to preset the voltage on U9-6. Normally it is set for P17 to P18. The P15 to P16 45 selection is for testing purposes to make the timing period equal to twenty seconds. When the voltage level on U9-7 is more negative than the preset voltage on U9-6 the output of U9-10 will swing from −15v to +15v. The level at U4-5 will be high then inverted at U4-6 (low). The level at U4-9 will also be low then inverted at U4-8 to provide a clean signal to clock the stop flip-flop 43 U8-11.

The level present on U8-12 will normally be high (not maint. mode) 6 and will be latched to the Q output U8-9. This high on each input of U2-4,5,6 will provide the low level on U2-15,14,13 to be momentarily switched onto the motor-off logic lines 27,28,49 that cause the motors to stop. As the low is active it also puts a low on U7-4,5 which clears U8-13. The capacitor C4 located at U8-13 is to slow down the low clear pulse to ensure all motors receive a sufficient stop pulse before it is cleared. This low stop pulse also clears U8-1 via U10-5 to ensure there is not a motor start 16 sequence active at this time. The simulator will now be ready for the next motion-on request 15 or 19.

The E.S.C.U. shown in FIG. 2 20 is identical to FIG. 1 except for the interfacing of the motor on and off commands with the simulator. This circuit would be used at an advantage of less production cost if the interfacing did not require opening up the circuit to switch from a low to a high. This circuit could be very easily adapted to a simulator that met the criteria. The isolation means for troubleshooting is to simply remove the E.S.C.U. from its socket.

DETAILED OPERATION OF ALTERNATE EMBODIMENT

Figure 3:
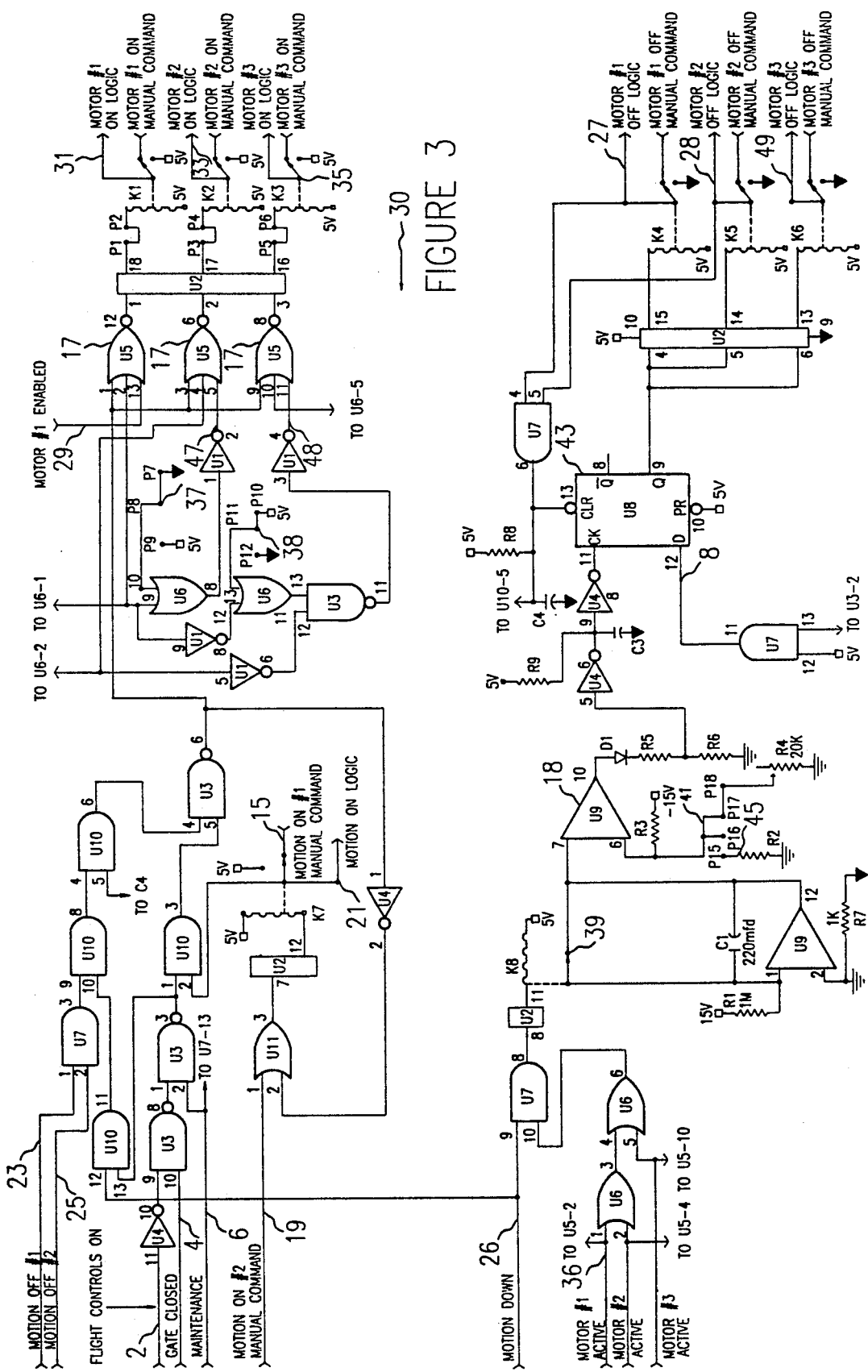
FIG. 3 is a schematic of E.S.C.U. No. 3 which is an alternate embodiment having a timer and relay interfacing for controlling three motor logic circuits.

Referring to FIG. 3, with the simulator hydraulic control cabinet power on, the E.S.C.U. board 30 is also powered but not activating any signals. The power requirements are +5 volts and ±15 volts for this E.S.C.U. All of the eight relays are in the deenergized state. When the control loading and cooling motor is turned on and the flight controls are on, the simulator is ready for flight training. The E.S.C.U. 30 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 30 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 by causing U3-3 (74LS00 NAND) to be high when the maintenance mode 6 is placing a low on U3-2. The motor-off pulse is prevented by the low logic level present on U8-12 via U7-13 8 (74LS08 AND). With the flight controls on 2, a low logic level is present on U4-11 (74LS04 INVERTOR) and the gate closed 4 (high on U3-10) the output of U3-8 is low. With the maintenance mode 6 off, (U3-2normally high) the output of U3-3 and U10-1 is high. When the motion-on momentary pushbutton 15 is selected, it places a high logic level on U10-2 and activates a latching circuit that keeps the motion-on logic 21 active. As U10-3goes high it will cause U3-6 to go low since a high is present on U3-4. The low from U3-6 is sent to each of the (74LS27) NOR gates 17 (U5-1,3,9) and to invertor U4-1 so that a high will be on U11-2 (74LS32 OR). The output of U11-3 will be high when the motion is turned on from either the manual control cabinet 19 or the momentary pushbutton 15 at the instructor's station. The output U11-3 enables U2-7 (ULN2803A) to pull in K7 (DF2E-DC-5V) to keep the motion-on logic 21 latched active while the motors are starting. The motion-on logic 21 will stay active as long as the high on U3-4 is present. U3-4 will go low when any motion-off request 23 or 25, motion rising from the down position 26, any motor-off request 27 or 28, flight controls off 2 or when the gate 4 is opened. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U10-4. The input to U10-5 is low when any motor-off request 27 or 28 is active via U7-6, to clear any active motor start 16 sequence when the motor-off 27 or 28 commands are active.

With all of the previous conditions correct to make an actual motion-on 21 sequence start, the output U3-6 will be low and sent to each separate motor start 17 sequence circuit U5-1,3,9. The first motor to start 29 will have a low on U5-2 (not active) and a low on U5-13 (enabled). This will output a high on U5-12 to enable the start relay K1 to send a high level out to the motor start logic 31. When this motor starts a high active signal 36 comes back into U6-9 to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P11 38 comprises a bypass means and is normally jumpered to ground. When jumpered to 5 volts it puts motor number two in bypass mode. Motors number two and number three will start 33,35 in the same manner as motor number one using U5-6,8 to provide the high level for U2-2,3 to pull in the relays K2 and K3.

When the motors are active, the hydraulic control cabinet provides a motion-ready signal (associated with the simulator and not shown on circuit diagram) and along with the motion-on logic 21 that is still active will result in the motion rising. The motor start 16 logic then resets and the simulator is operating in its usual state, all safety and warning logic is operating and the flight training continues as usual. Note that during the motor start 16 sequence, the timer 18 for controlling the motor-off logic is running as explained on this page. The timer 18 will not actually finish before the motion 26 is up and resets it via U7-9.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. This causes U2-11 to supply a low level (current sink) to pull in K8. This starts the timer 18 for controlling the motor-off sequence. When K8 energizes it removes the short 39 across C1 (220mfd) and allows C1 to start charging. This creates a ramp generator with the output of U9-12 (UA747CN) slowly going more negative. This time period can be preset to any time specified by the user, typically it will be set for two minutes. The potentiometer R4 and R2 can be individually connected with jumpers 41 P15,16,17,18 to preset the voltage on U9-6. Normally it is set for P17 to P18. The P15 to P16 45 selection is for testing purposes to make the timing period equal to twenty seconds. When the voltage level on U9-7 is more negative than the preset voltage on U9-6 the output of U9-10 will swing from −15v to +15v. The level at U4-5 will be high then inverted at U4-6 (low). The level at U4-9 will also be low then inverted at U4-8 to provide a clean signal to clock the stop flip-flop 43 U8-11 (74LS74). The level present on U8-12 will normally be high (not maint. mode) 6 and will be latched to the Q output U8-9.

This high on each input of U2-4,5,6 will energize the relays K4,5,6 causing a low level to be momentarily switched onto the motor-off logic lines 27,28,49 that cause the motors to stop. As the low is active it also puts a low on U7-4,5 which clears U8-13. The capacitor C4 located at U8-13 is to slow down the low clear pulse to ensure all motors receive a sufficient stop pulse before it is cleared. This low stop pulse also goes to U10-5 to ensure there is not a motor start 16 sequence active at this time. The simulator will now be ready for the next motion-on request 15 or 19.

The E.S.C.U. shown in FIG. 3 30 is identical to FIG. 1 except for the different motor start 16 logic. Instead of using a flip-flop the same results are achieved with logic gates. It is easily adapted to any type of simulator. The design includes three motor stop circuits to make it universal. Some simulators will only require one stop signal that will itself turn off all three motors. Because the added cost and labor to include the other two relay circuits is very minimal they were included. The advantage of this circuit being added to the existing equipment instead of modifying the equipment is the reduced complexity. If the simulator needs troubleshooting, an isolation means is provided whereby the E.S.C.U. can be easily bypassed by removing it and inserting a board with jumper wires. The relays for the motor start and stop commands are to make it adaptable to logic lines that are hard wired to ground for a low logic level and 5v for a high logic level.

DETAILED OPERATION OF ALTERNATE EMBODIMENT

Figure 4:
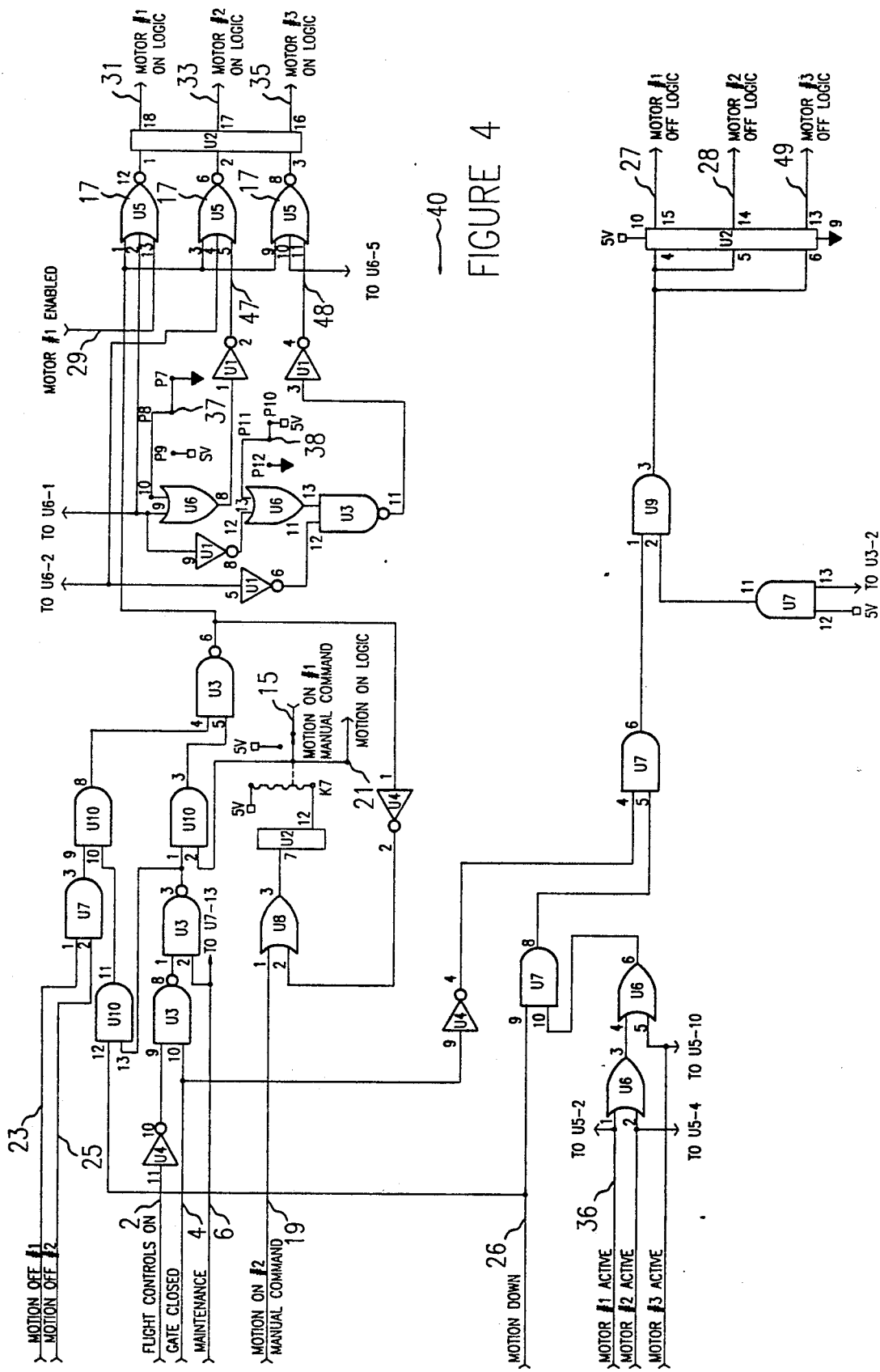
FIG. 4 is a schematic of E.S.C.U. No. 4 which is an alternate embodiment having no timer and direct interfacing for controlling three motor logic circuits.

Referring to FIG. 4, with the simulator hydraulic control cabinet power on, the E.S.C.U. 40 board is also powered but not activating any signals. The power requirement is +5 volts for this E.S.C.U. The relay, K7 is in the deenergized state. When the control loading and cooling motor is turned on and the flight controls are on, the simulator is ready for flight training. The E.S.C.U. 40 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 40 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 via U3-3 (74LS00 NAND) being at a high level due to U3-2 being low during maintenance mode 6. The motor-off pulse is prevented by the low logic level present on U9-2 (74LS08 AND) via U7-13.

With the flight controls on 2, a low logic level is present on U4-11 (74LS04 INVERTOR) and the gate closed 4 (high on U3-10) the output of U3-8 is low. With the maintenance mode 6 off, (U3-2 normally high) the output of U3-3 and U10-1 is high. When the motion-on momentary pushbutton 15 is selected, it places a high logic level on U10-2 and active. As U10-3 goes high it will cause U3-6 to go low since a high is present on U3-4. The low from U3-6 is sent to each of the (74LS27) NOR gates 17 (U5-1,3,9) and to invertor U4-1 so that a high will be on U8-2 (74LS32 OR). The output of U8-3 will be high when the motion is turned on from either the manual control cabinet 19 or the momentary pushbutton 15 at the instructor's station. The output U8-3 enables U2-7 (ULN2803A) to pull in K7 (DF2E-DC-5V) to keep the motion-on logic 21 latched active while the motors are starting. The motion-on logic 21 will stay active as long as the high on U3-4 is present. U3-4 will go low when any motion-off request 23 or 25, motion rising from the down position 26, flight controls off 2 or when the gate is opened 4. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U3-4.

With all of the previous conditions correct to make an actual motion-on 21 sequence start, the output U3-6 will be low and sent to each separate motor start 17 sequence circuit U5-1,3,9. The first motor to start 29 will have a low on U5-2 (not active) and a low on U5-13 (enabled). This will output a high on U5-12 to enable U2-1 to send a start command out to the motor start logic 31 via U2-18. When this motor starts a high active signal 36 comes back into U6-9 to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P11 38 comprises a bypass means and is normally jumpered to ground. When jumpered to 5 volts it puts motor number two in bypass mode. Motors number two and number three will start 33,35 in the same manner as motor number one using U5-6,8 to provide the high level for U2-2,3 to provide the start commands at U2-17,16. When the motors are active, the hydraulic control cabinet provides a motion-ready signal (associated with the simulator and not shown on circuit diagram) and along with the motion-on logic 21 that is still active, will result in the drawbridge and motion coming up. The motor start 16 logic then resets and the simulator is operating in its usual state, all safety and warning logic is operating and the flight training continues as usual.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. When the gate 4 is opened the motor-off sequence is activated by placing a low on U4-3 inverted at U4-4 and sent to U7-4. The output of U7-6 will then be high and sent to U9-1. The level on U9-2 will normally be high (not in maint. mode) 6. The output U9-3 will go high and will enable U2-4,5,6 to provide the momentary motor-off 27,28,49 commands. The simulator will now be ready for the next motion-on request 15 or 19.

The E.S.C.U. shown in FIG. 4 40 does not have a timer to delay the motor-off commands. The disadvantage of this type of circuit is decreased fluid filtering action that is normally active during the period before the timer finishes. There is also some loss of energy savings due to the need for a gate having to be opened to trigger the motor stop logic. This circuit is not generally preferred because of these potential problems. It is included to represent a basic design that does not include all of the features of the most preferred embodiment.

DETAILED OPERATION OF ALTERNATE EMBODIMENT

Figure 5:
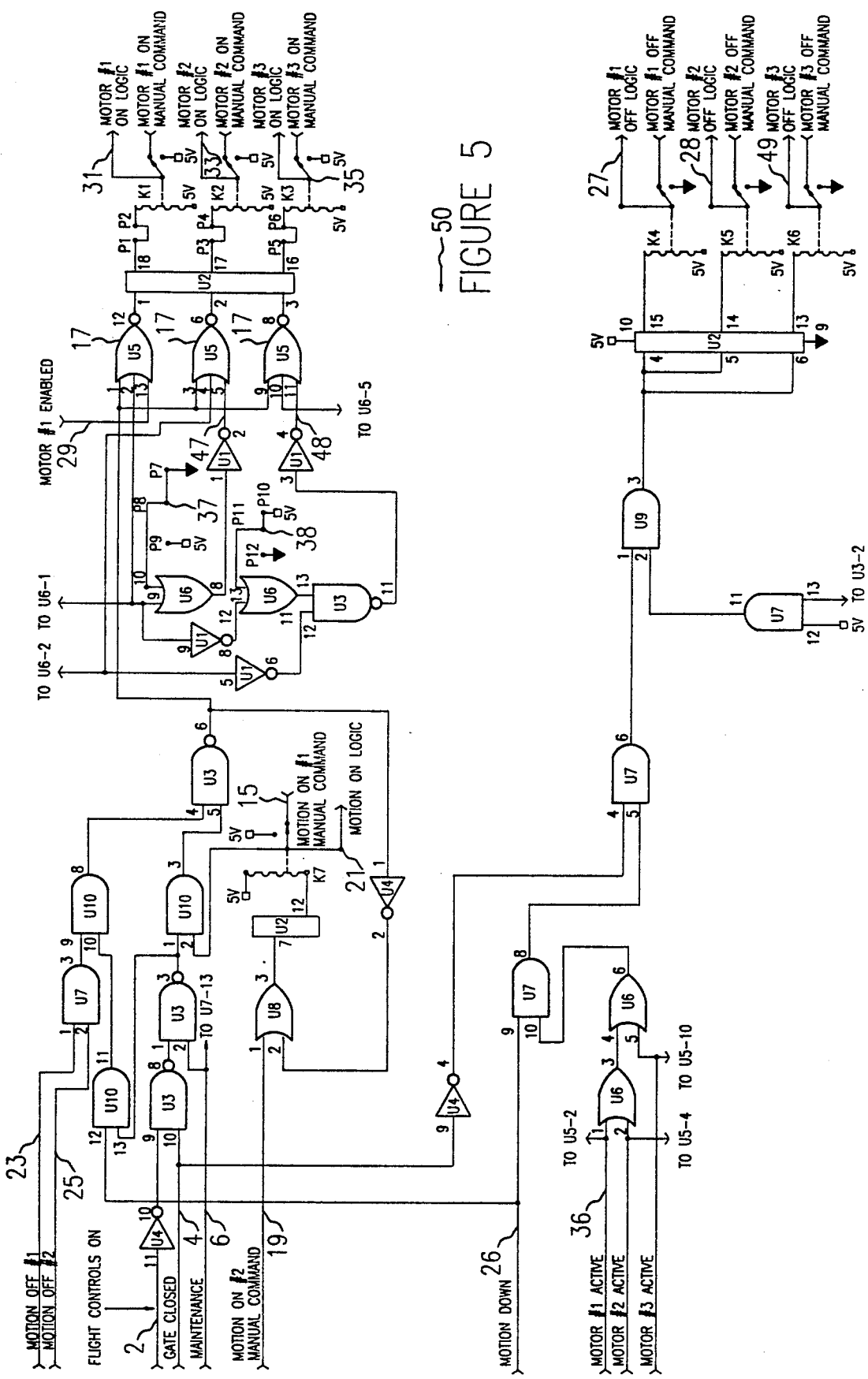
FIG. 5 is a schematic of E.S.C.U. No. 5 which is an alternate embodiment having no timer and relay interfacing for controlling three motor logic circuits.

Referring to FIG. 5, with the simulator hydraulic control cabinet power on, the E.S.C.U. 50 board is also powered but not activating any signals. The power requirement is 5 volts for this E.S.C.U. All of the seven relays are in the deenergized state. When the control loading and cooling motor is turned on and the flight controls are on, the simulator is ready for flight training. The E.S.C.U. 50 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 50 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 via U3-3 (74LS00 NAND) being at a high level due to U3-2 being low during maintenance mode 6. The motor-off pulse is prevented by the low logic level present on U9-2 (74LS08 AND) via U7-13.

With the flight controls on 2, a low logic level is present on U4-11 (74LS04 INVERTOR) and the gate closed 4 (high on U3-10) the output of U3-8 is low. With the maintenance mode 6 off, (U3-2 normally high) the output of U3-3 and U10-1 is high. When the motion-on momentary pushbutton 15 is selected, it places a high logic level on U10-2 and activates a latching circuit that keeps the motion-on logic 21 active. As U10-3 goes high it will cause U3-6 to go low since a high is present on U3-4. The low from U3-6 is sent to each of the (74LS27) NOR gates 17 (U5-1,3,9) and to invertor U4-1 so that a high will be on U8-2 (74LS32 OR). The output of U8-3 will be high when the motion is turned on from either the manual control cabinet 19 or the momentary pushbutton 15 at the instructor's station.

The output U8-3 enables U2-7 (ULN2803A) to pull in K7 (DF2E-DC-5V) to keep the motion-on logic 21 latched active while the motors are starting. The motion-on logic 21 will stay active as long as the high on U3-4 is present. U3-4 will go low when any motion-off request 23 or 25, motion rising from the down position 26, flight controls 2 off or when the gate 4 is opened. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U3-4.

With all of the previous conditions correct to make an actual motion-on 21 sequence start, the output U3-6 will be low and be sent to each separate motor start 17 sequence circuit U5-1,3,9. The first motor 29 to start will have a low on U5-2 (not active) and a low on U5-13 (enabled). This will output a high on U5-12 to enable the start relay K1 to send a high level out to the motor 31 start logic. When this motor starts a high active signal 36 comes back into U6-9 to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first.

Motor number three will get its enable signal 48 U5-11 via U1-3,4 invertor, which is the logic output of U3-11 that provides the logic from motor number two. The jumper P11 38 comprises a bypass means and is normally jumpered to ground. When jumpered to 5 volts it puts motor number two in bypass mode. Motors number two and number three will start 33,35 in the same manner as motor number one using U5-6,8 to provide the high level for U2-2,3 to provide the high level for U2-2,3 to pull in the relays K2 and K3. When the motors are active, the hydraulic control cabinet provides a motion-ready signal (associated with the simulator and not shown on circuit diagram) and along with the motion-on logic 21 that is still active, will result in the drawbridge and motion coming up. The motor start 16 logic then resets and the simulator is operating in its usual state, all safety and warning logic is operating and the flight training continues as usual.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. When the gate 4 is opened the motor-off sequence is activated by placing a low on U4-3 inverted at U4-4 and sent to U7-4. The output of U7-6 will then be high and sent to U9-1. The level on U9-2 will normally be high (not in maint. mode) 6. The output U9-3 will go high and will enable U2-4,5,6 to pull in the relays K4,K5,K6 to provide the momentary motor-off 27,28,49 commands. The simulator will now be ready for the next motion-on request 15 or 19.

The E.S.C.U. shown in FIG. 5 50 is identical to FIG. 4 except for the relay interfacing option. This circuit does not have a timer to delay the motor-off commands. The disadvantage of this type of circuit is decreased fluid filtering action that is normally active during the period before the timer finishes. There is also some loss of energy savings due to the need for a gate having to be opened to trigger the motor stop logic. This circuit is not generally preferred because of these potential problems. It is included to represent a basic design that does not include all of the features of the most preferred embodiment.

DETAILED OPERATION OF ALTERNATE EMBODIMENT

Referring to FIG. 6, with the simulator hydraulic control cabinet power on, the E.S.C.U. 60 board is also powered but not activating any signals. The power requirements are +5 volts and ±15 volts for this E.S.-C.U. All of the eight relays are in the deenergized state. When the control loading and cooling motor is turned on and the flight controls are on, the simulator is ready for flight training. The E.S.C.U. 60 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 60 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 via U3-3 (74LS00 NAND) being at a high level due to U3-2 being low during maintenance mode 6. The motor-off pulse is prevented by the low logic level present on U7-5 (74LS08 AND) via U7-13.

With the flight controls on 2, a low logic level is present on U4-11 (74LS04 INVERTOR) and the gate closed 4 (high on U3-10) the output of U3-8 is low. With the maintenance mode 6 off, (U3-2 normally high) the output of U3-3 and U10-1 is high. When the motion-on momentary pushbutton 15 is selected, it places a high logic level on U10-2 and activates a latching circuit that keeps the motion-on logic 21 active. As U10-3 goes high it will cause U3-6 to go low since a high is present on U3-4. The low from U3-6 is sent to each of the (74LS27) NOR gates 17 (U5-1,3,9) and to invertor U4-1 so that a high will be on U8-2 (74LS32 OR). The output of U8-3 will be high when the motion is turned on from either the manual control cabinet 19 or the momentary pushbutton 15 at the instructor's station.

The output U8-3 enables U2-7 (ULN2803A) to pull in K7 (DF2E-DC-5V) to keep the motion-on logic 21 latched active while the motors are starting. The motion-on logic 21 will stay active as long as the high on U3-4 is present. U3-4 will go low when any motion-off request 23 or 25, motion rising from the down position 26, flight controls off 2 or when the gate 4 is opened. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U3-4.

With all of the previous conditions correct to make an actual motion-on 21 sequence start the output U3-6 will be low and be sent to each separate motor start 17 sequence circuit U5-1,3,9. The first motor to start 29 will have a low on U5-2 (not active) and a low on U5-13 (enabled). This will output a high on U5-12 to enable the start relay K1 to send a high level out to the motor start 31 logic. When this motor starts a high active 36 signal comes back into U6-9 to make U6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P1 38 comprises a bypass means and is normally jumpered to ground. When jumpered to 5 volts it puts motor number two in bypass mode. Motors number two and number three will start 33,35 in the same manner as motor number one using U5-6,8 to provide the high level for U2-2,3 to pull in the relays K2 and K3. When the motors are active, the hydraulic control cabinet provides a motion-ready signal (associated with the simulator and not shown on circuit diagram) and along with the motion-on logic 21 that is still active, will result in the drawbridge and motion coming up. The motor start 16 logic then resets and the simulator is operating in its usual state, all safety and warning logic is operating and the flight training continues as usual.

Note that during the motor start 16 sequence, the timer 18 for controlling the motor-off logic is running as explained on this page. The timer 18 will not have time to finish before the motion is up and resets it via U7-9.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. This causes U2-11 to supply a low level (current sink) to pull in K8. This starts the timer 18 for controlling the motor-off sequence. When K8 energizes it removes the short 39 across C1 (220mfd) and allows C1 to start charging. This creates a ramp generator with the output of U9-12 (UA747CN) slowly going more negative. This time period can be preset to any time specified by the user, typically it will be set for two minutes. The potentiometer R4 and R2 can be individually connected with jumpers 41 p15,16,17,18 to preset the voltage on U9-6. Normally it is set for P17 to P18. The P15 to P1-6 selection is for testing purposes to make the timing period equal to twenty seconds. When the voltage level on U9-7 is more negative than the preset voltage on U9-6 the output of U9-10 will swing from −15v to +15v. The level at U4-5 will be high then inverted at U4-6 (low). The level at U4-9 will also be low then inverted again and spike protected by C3 to provide a clean signal to be sent to U7-4. The level present on U7-5 will normally be high (not maint. mode) 6. The high level then present on U7-6 will activate the motor-off sequence. This high on each input of U2-4,5,6 will energize the relays K4,5,6 causing a low level to be momentarily switched onto the motor-off 27,28,49 logic lines that cause the motors to stop. The simulator will now be ready for the next motion-on request 15 or 19.

The E.S.C.U. shown in FIG. 6 60 is similar to FIG. 3 except for the stop logic, the flip-flop has been replaced by a logic gate. It is easily adapted to any type of simulator. The design includes three motor stop circuits to make it universal. Some simulators will only require one stop signal that will itself turn off all three motors. Because the added cost and labor to include the other two relay circuits is very minimal they were included. The advantage of this circuit being added to the existing equipment instead of modifying the equipment is the reduced complexity. If the simulator needs troubleshooting, an isolation means is provided whereby the E.S.C.U. can be easily bypassed by removing it and inserting a board with jumper wires. The relays for the motor start and stop commands are to make it adaptable to logic lines that are hard wired to ground for a low logic level and 5v for a high logic level.

DETAILED OPERATION OF ALTERNATE EMBODIMENT

Figure 7:
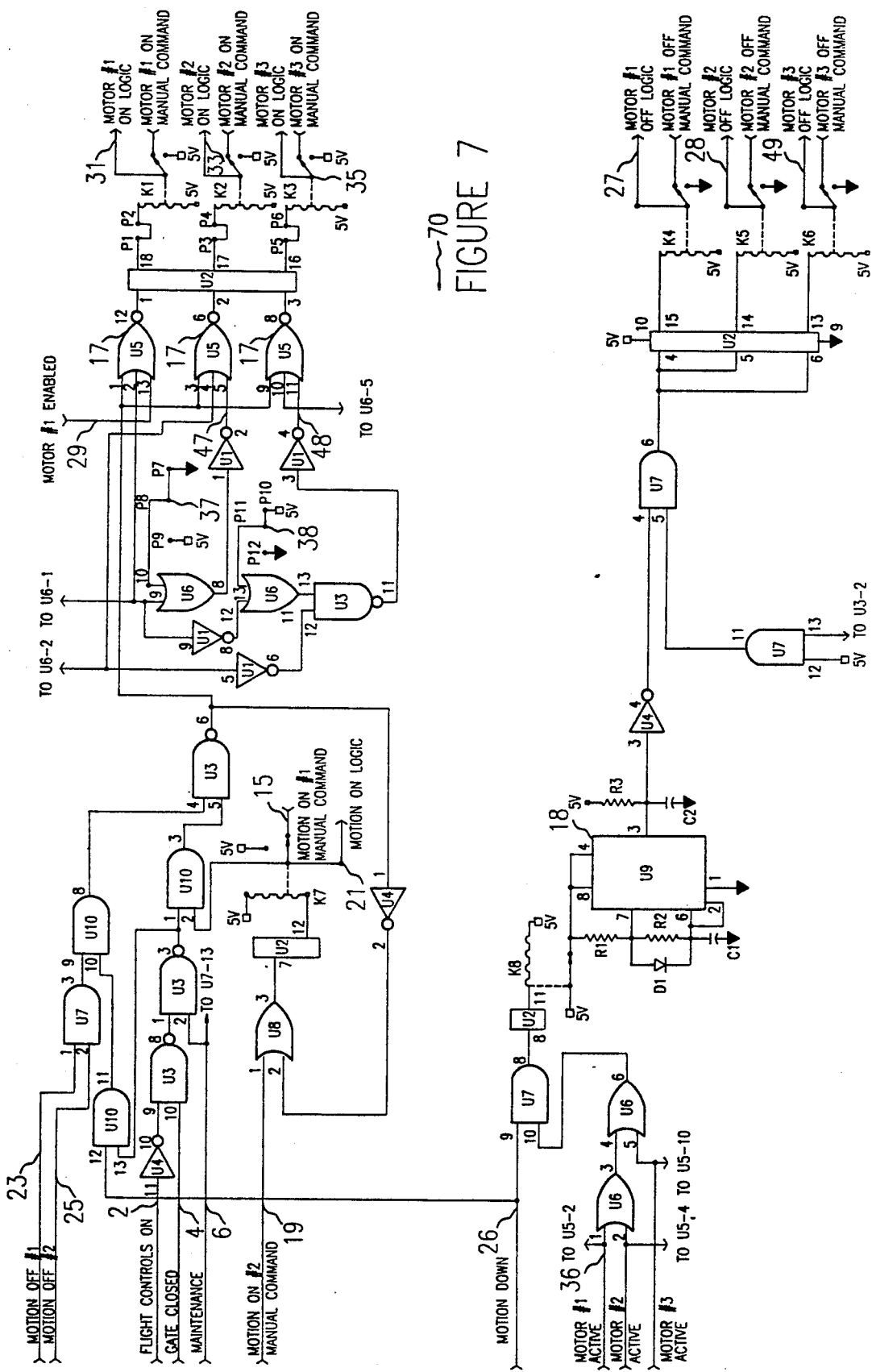
FIG. 7 is a schematic of E.S.C.U. No. 7 which is an alternate embodiment having a timer and relay interfacing for controlling three motor logic circuits.
Figure 9:
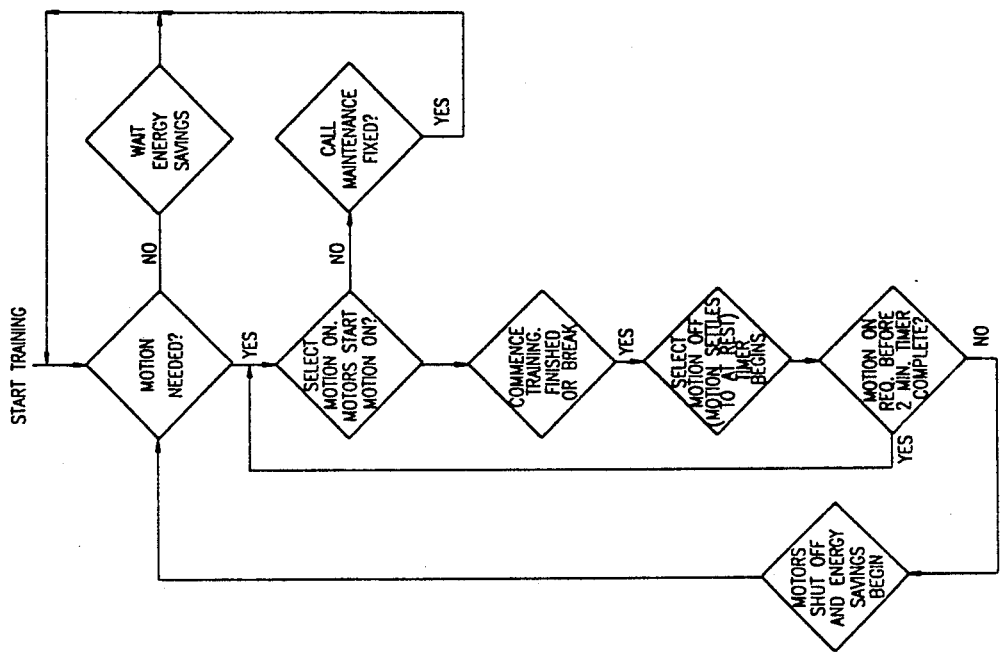
FIG. 9 is a flowchart of the new process method of the preferred embodiment.
Figure 8:
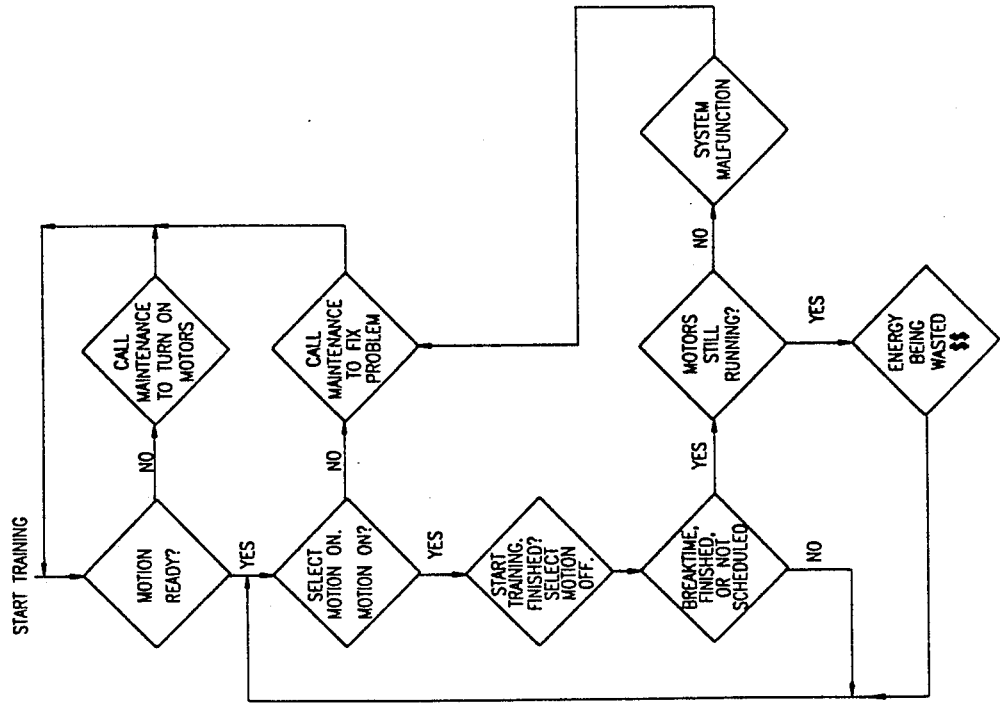
FIG. 8 is a flowchart of the current process prior art method.

Referring to FIG. 7, with the simulator hydraulic control cabinet power on, the E.S.C.U. 70 board is also powered but not activating any signals. The power requirements are +5 volts for this E.S.C.U. All of the eight relays are in the deenergized state. When the control loading and cooling motor is turned on and the flight controls are on, the simulator is ready for flight training. The E.S.C.U. 70 senses several signals, then at the time of a motion-on request 15 or 19 it automatically starts the motion motors and keeps the motion-on logic 21 active, so that when the motors are active, the motion will activate without another motion-on request 15 or 19. The E.S.C.U. 70 will automatically shut off the motors when the motion is not in use. A means of overriding the automatic motor-off command is available by placing the simulator in the maintenance mode 6 to allow the motors to continue running. This is for troubleshooting purposes or to perform fluid filtering procedures. This maintenance mode 6 allows the motor start 16 sequence to activate regardless of the state of the flight controls 2 or the ingress/egress gate position 4 via U3-3 (74LS00 NAND) being at a high level due to U3-2 being low during maintenance mode 6. The motor-off pulse is prevented by the low logic level present on U7-5 (74LS08 AND) via U7-13.

With the flight controls on 2, a low logic level is present on U4-11 (74LS04 INVERTOR) and the gate closed 4 (high on U3-10) the output of U3-8 is low. With the maintenance mode 6 off, (U3-2 normally high) the output of U3-3 and U10-1 is high. When the motion-on momentary pushbutton 15 is selected, it places a high logic level on U10-2 and activates a latching circuit that keeps the motion-on logic 21 active. As U10-3 goes high it will cause U3-6 to go low since a high is present on U3-4. The low from U3-6 is sent to each of the (74LS27) NOR gates 17 (U5-1,3,9) and to invertor U4-1 so that a high will be on U8-2 (74LS32 OR). The output of U8-3 will be high when the motion is turned on from either the manual control cabinet 19 or the momentary pushbutton 15 at the instructor's station.

The output U8-3 enables U2-7 (ULN2803A) to pull in K7 (DF2E-DC-U2-7) to keep the motion-on logic 21 latched active while the motors are starting. The motion-on logic 21 will stay active as long as the high on U3-4 is present. U3-4 will go low when any motion-off request 23 or 25, motion rising from the down position 26, flight controls off 2 or when the gate is opened 4. Motion-off requests 23,25 are on U7-1,2 and the down logic 26 is on U10-12, the flight control 2 and gate logic 4 comes from U3-3 and these outputs are summed up at U10-9,10 and the output of U10-8 goes to U3-4.

With all of the previous conditions correct to make an actual motion-on 21 sequence start the output U3-6 will be low and be sent to each separate motor start 17 sequence circuit U5-1,3,9. The first motor 29 to start will have a low on U5-2 (not active) and a low on U5-13 (enabled) This will output a high on U5-12 to enable the start relay K1 to send a high level out to the motor start 31 logic. When this motor starts a high active signal 36 comes back into U6-9 to make U-6-8 go high and inverted at U1-1,2 to provide an enable signal 47 at U5-5 for motor number two to start. The jumpers 37 P7,8,9 (normally P7-P8) on U6-10 comprise a bypass means to bypass motor number one logic when it is not in service to allow motor number two to start first. Motor number three will get its enable signal 48 U5-11 via U1-3,4 invertor, which is the logic output of U3-11 that provides the logic from motor number two. The jumper P11 38 comprises a bypass means and is normally jumpered to ground. When jumpered to 5 volts puts motor number two in bypass mode. Motors number two and number three will start 33,35 in the same manner as motor number one using U5-6,8 to provide the high level for U2-2,3 to pull in the relays K2 and K3. When the motors are active, the hydraulic control cabinet provides a motion-ready signal (associated with the simulator and not shown on circuit diagram) and along with the motion-on logic 21 that is still active, will result in the drawbridge and motion coming up. The motor start 16 logic then resets and the simulator is operating in its usual state, all safety and warning logic is operating and the flight training continues as usual.

Note that during the motor start 16 sequence, the timer 18 for controlling the motor-off logic is running as explained on this page. The timer 18 will not have time to finish before the motion 26 is up and resets it via U7-9.

When the training session ends, the motion-off 23 is selected and the motion settles to its down position 26 and places a high on U7-9. The motor active signals on U6-1,2,5 are all high and result in a high on U7-10. The output of U7-8 goes high when the motion is down 26. This causes U2-11 to supply a low level (current sink) to pull in K8. This starts the timer 18 for controlling the motor-off sequence. When K8 energizes it supplies power to U9 (NE555P). The output U9-3 is held at a high level by resistor R3 and stays high when K8 energizes. The capacitor C2 is to eliminate any momentary low glitch that might occur when K8 energizes. The capacitor C1 (220mfd) begins charging through R1 and D1. When the capacitor voltage reaches two thirds of the supply voltage (5v) the 555 timer U9 switches the output low. Then C1 discharges through R2 into U9-7. When the capacitor voltage C1 drops to one third of 5v the cycle will repeat. Because the output U9-3 will go low after a time period preset by the values of R1,R2,C1 the invertor U4-4 will be high and be sent to U7-4. The level present on U7-5 will normally be high (not maint. mode) 6. The high level then present on U7-6 will activate the motor-off sequence. This high on each input of U2-4,5,6 will energize the relays K4,5,6 causing a low level to be momentarily switched onto the motor-off logic 27,28,49 lines that cause the motors to stop. The simulator will now be ready for the next motion-on request 15 or 19.

The E.S.C.U. shown in FIG. 7 70 is identical to FIG. 6 except for the timer circuit which was replaced by a 555 timer. It is easily adapted to any type of simulator. The design includes three motor stop circuits to make it universal. Some simulators will only require one stop signal that will itself turn off all three motors. Because the added cost and labor to include the other two relay circuits is very minimal they were included. The advantage of this circuit being added to the existing equipment instead of modifying the equipment is the reduced complexity. If the simulator needs troubleshooting, an isolation means is provided whereby the E.S.C.U. can be easily bypassed by removing it and inserting a board with jumper wires. The relays for the motor start and stop commands are to make it adaptable to logic lines that are hard wired to ground for a low logic level and 5v for a high logic level.

Detailed Operation of Filter Bypass Option

The filter monitoring circuit on a flight simulator is typically a pressure switch in each filter housing that actuates when the differential pressure is at a preset point to detect clogged filters. The switch will send a ground to the simulator motion control cabinet to activate a filter fail condition that will shut off the motor associated with that filter.

Referring to FIG. 10, this add on option 100 will monitor the hydraulic fluid temperature by interfacing with the existing temperature signal 102. The polarity of the signal may vary between simulators therefore the inputs 104 and 106 to amplifier U15 (UA747CN) may have to be reversed to suit the actual temperature signal 102. When the fluid temperature has dropped to a preset value determined by the value of R24 the output 108 of U15-12 will swing to +15 volts. This voltage via R20 110 will turn on the transistor Q1 (TIP31A) 112. The voltage 114 across R22 due to the current flow through Q1 will be approximately 5v to energize K9 116 (DS4E-S-DC5V). When K9 energizes, the filter logic circuits 118,122 and 126 will be switched to 5 volts to prevent the actual filter conditions 120,124 and 128 from reporting to the motion control cabinet until the fluid has reached a normal temperature. If an actual clogged filter condition is present at this time the system will operate in its normal mode and shutdown or in some cases report a filter warning and continue to operate as usual.

I claim:

1. A motor-control system for use with flight simulators of the type having a motion function and at least one motor having manually activated motor on/off logic circuitry, which at least one motor powers the motion function; said motor-control system including electronic circuitry for providing an automatic motor on/off command to at least one motor responsive to the existence of certain prescribed simulator conditions; said electronic circuitry including:
   A. a plurality of sensors for detecting the various states of simulator functions;
   B. a first logic circuit for receiving input from said sensors and activating a start-up sequence;
   C. a second logic circuit for receiving input from said sensors and activating a shut-down command to said at least one motor;
   D. interface means for operatively integrating said motor-control system to at least one simulator motor and motion on/off logic circuitry;
   whereby said motor-control system senses the simulator conditions and responsive thereto automatically starts up and shuts down at least one motor, thereby creating energy savings.

2. A motor-control system according to claim 1, wherein said interface means comprises a plurality of relay devices for providing normal circuit continuity for the simulator manually activated motor-on/off logic circuitry, and for providing isolated switching from the motor-control system for purposes of automatically and separately activating automatic motor-on/off commands.

3. A motor-control system according to claim 1, wherein said interface means comprises a digital integrated circuit component directly interfacing the motor-control system to the simulator.

4. A motor-control system for use with flight simulators of the type having a motion function and at least one motor having manually activated motor on/off logic circuitry, which at least one motor powers the motion function; said motor-control system including electronic circuitry for providing an automatic motor on/off command to at least one motor responsive to the existence of certain prescribed simulator conditions; said electronic circuitry including:
   A. a plurality of sensors for detecting the various states of simulator functions;
   B. a first logic circuit for receiving input from said sensors and activating a start-up sequence;
   C. a second logic circuit for receiving input from said sensors and activating a shut-down command to said at least one motor;
   D. interface means for operatively integrating said motor-control system to at least one motor and motion on/off logic circuitry;
   E. timer means for controlling the time period which lapses between deactivating of the simulator motion function and the automatic activation of said shut-down command;
   whereby said motor-control system enables, for a predetermined period, a delay between the time the simulator motion function is manually deactivated and the time at least one motor automatically shuts down.

5. A motor-control system according to claim 4, wherein said interface means comprises a plurality of relay devices for providing normal circuit continuity for the simulator manually activated motor-on/off logic circuitry, and for providing isolated switching from the motor-control system for automatically and separately activating automatic motor-on/off commands.

6. A motor-control system according to claim 4, wherein said interface means comprises a digital integrated circuit component directly interfacing the motor-control system to the simulator.

7. The motor-control system according to claim 1, wherein said first logic circuit includes a latching circuit means for regenerating a motion-on signal as part of the start-up sequence, which sequence continues one motor at a time until all necessary simulator motors are activated and the motion function is on.

8. A motor-control system according to claim 1, wherein said first logic circuit includes bypass means for physically bypassing an individual motor-start command, and going to a next motor start command in sequence.

9. A motor-control system according to claim 1, wherein said second logic circuit includes a means for overriding the shut-down command, whereby allowing at least one motor to continue running when deemed necessary by the user.

10. A motor-control system according to claim 1, further including:
A. said flight simulator having a warning signal means for warning against a possible filter clog in a hydraulic fluid line;
B. said motor-control system having a deterrence means for preventing the activation of the warning signal means until the hydraulic fluid in the fluid line reaches a prescribed temperature.

11. A motor-control system according to claim 10, wherein said deterrence means comprises:
A. a temperature monitoring circuit which monitors the temperature of the hydraulic fluid;
B. relay switching means for controlling said warning signal means;
whereby, responsive to sensing a hydraulic fluid temperature below a prescribed level, said relay switching means overrides said warning signal means.

12. A motor-control system according to claim 1, wherein said plurality of sensors includes at least one sensor for detecting a respective one of the following:
1) the active/nonactive status of the motors; 2) the on/off status of a flight control; 3) the status of an ingress/egress gate position; 4) the status of the simulator motion function; 5) the status of a motion-on/off manual command; for logically providing the automatic motor on and off commands.

13. A motor-control system according to claim 1, further including an isolation means for bypassing said motor-control system when a malfunction occurs in the flight simulator, which malfunction must be evaluated to determine whether the fault exists in the flight simulator circuitry or in the motor-control circuitry.

14. A motor-control system according to claim 4, wherein said first logic circuit includes a latching circuit means for regenerating a motion-on signal as part of the start-up sequence, which sequence continues one motor at a time until all necessary simulator motors are activated and the motion function is on.

15. A motor-control system according to claim 4, wherein said first logic circuit includes bypass means for physically bypassing an individual motor-start command, and going to a next motor start command in sequence.

16. A motor-control system according to claim 4, wherein said second logic circuit includes a means for overriding the shut-down command, whereby allowing at least one motor to continue running when deemed necessary by the user.

17. A motor-control system according to claim 4, further including:
A. said flight simulator having a warning signal means for warning against a possible filter clog in a hydraulic fluid line;
B. said motor-control system having a deterrence means for preventing the activation of the warning signal means until the hydraulic fluid in the fluid line reaches a prescribed temperature.

18. A motor-control system according to claim 17, wherein said deterrence means comprises:
A. a temperature monitoring circuit which monitors the temperature of the hydraulic fluid;
B. relay switching means for controlling said warning signal means;
whereby, responsive to sensing a hydraulic fluid temperature below a prescribed level, said relay switching means overrides said warning signal means.

19. A motor-control system according to claim 4, wherein said plurality of sensors includes at least one sensor for detecting a respective one of the following:
1) the active/nonactive status of the motors; 2) the on/off status of a flight control; 3) the status of an ingress/egress gate position; 4) the status of the simulator motion function; 5) the status of a motion-on/off manual command; for logically providing the automatic motor on and off commands.

20. A motor-control system according to claim 4, further including an isolation means for bypassing said motor-control system when a malfunction occurs in the flight simulator, which malfunction must be evaluated to determine whether the fault exists in the flight simulator circuitry or in the motor-control circuitry.

21. A method for controlling the on/off circuitry of at least one motor associated with the motion function of a flight simulator having manually activated motor on/off logic circuitry, which at least one motor powers the motion function; a motor-control system including electronic circuitry for providing an automatic on/off command to at least one motor responsive to the existence of certain prescribed simulator conditions; said method including the steps of:
A. electronically sensing a user-generated request to activate the motion function of the flight simulator while simultaneously and electronically detecting the prescribed conditions including: 1) the active/nonactive status of the motors; 2) the on/off status of a flight control; 3) the status of an ingress/egress gate position; 4) the status of the simulator motion function; 5) the status of a motion-on/off manual command;
B. electronically activating a motor-start sequence responsive to said detection of prescribed conditions;

C. electronically activating a motion-on signal responsive to said request and to satisfaction of said prescribed conditions;

D. electronically sensing a user-generated request to deactivate the motion function of the flight simulator after a training session is complete;

E. responsive to said deactivation request to electronically sense the active state of the motors and the position of a motion platform to determine prescribed shut-down condition;

F. electronically activating a timing sequence responsive to satisfaction of said prescribed shut-down conditions;

G. electronically activating a system shut-down command responsive to the expiration of the timing sequence;

whereby creating energy savings by cutting off motors during unused periods of the motion function.

22. A method for controlling the on/off circuitry of at least one motor associated with the motion function of a flight simulator having manually activated motor on/off logic circuitry, which at least one motor powers the motion function; a motor-control system including electronic circuitry for providing an automatic on/off command to at least one motor responsive to the existence of certain prescribed simulator conditions; said method including the steps of:

A. electronically sensing a user-generated request to activate the motion function of the flight simulator while simultaneously and electronically detecting the prescribed conditions including: 1) the active/nonactive status of the motors; 2) the on/off status of a flight control; 3) the status of an ingress/egress gate position; 4) the status of the simulator motion function; 5) the status of a motion-on/off manual command;

B. electronically activating a motor-start sequence responsive to said detection of prescribed conditions;

C. electronically activating a motion-on signal responsive to said request and to satisfaction of said prescribed conditions;

D. electronically sensing a user-generated request to deactivate the motion function of the flight simulator after a training session is complete;

E. responsive to said deactivation request to electronically sense conditions including the active state of the motors, the position of a motion platform and the user induced ingress/egress gate position to determine prescribed shut-down conditions;

F. electronically activating a system shut-down command responsive to satisfaction of said prescribed conditions;

whereby crating energy savings by cutting off motors during unused periods of the motion function.

* * * * *